(12) United States Patent
Uhm

(10) Patent No.: US 10,955,139 B2
(45) Date of Patent: Mar. 23, 2021

(54) FUEL NOZZLE ASSEMBLY, AND FUEL NOZZLE MODULE AND GAS TURBINE HAVING THE SAME

(71) Applicant: Doosan Heavy Industries & Construction Co., LTD., Changwon-si (KR)

(72) Inventor: Jongho Uhm, Yongin-si (KR)

(73) Assignee: Doosan Heavy Industries & Construction Co., LTD., Changwon-Si (KR)

( * ) Notice: Subject to any disclaimer, the term of this patent is extended or adjusted under 35 U.S.C. 154(b) by 345 days.

(21) Appl. No.: 15/963,041

(22) Filed: Apr. 25, 2018

(65) Prior Publication Data
US 2018/0313543 A1 Nov. 1, 2018

(30) Foreign Application Priority Data
Apr. 27, 2017 (KR) .......................... 10-2017-0054126

(51) Int. Cl.
*F23R 3/14* (2006.01)
*F23R 3/46* (2006.01)
(Continued)

(52) U.S. Cl.
CPC ............... *F23R 3/14* (2013.01); *F23D 14/02* (2013.01); *F23R 3/28* (2013.01); *F23R 3/46* (2013.01);
(Continued)

(58) Field of Classification Search
CPC ...... F23R 3/02; F23R 3/10; F23R 3/12; F23R 3/14; F23R 3/045; F23R 3/16; F23R 3/26; F23R 3/28; F23R 3/46
See application file for complete search history.

(56) References Cited

U.S. PATENT DOCUMENTS 6,634,175 B1 * 10/2003 Kawata ................. F23R 3/04
60/746
7,770,395 B2 * 8/2010 Tanimura .............. F23R 3/04
60/737
(Continued)

FOREIGN PATENT DOCUMENTS

CN 102997280 A 3/2013
CN 204513457 U 7/2015
(Continued)

OTHER PUBLICATIONS

Korean Office Action for 10-2017-0054126.
Chinese Office Action.

*Primary Examiner* — Craig Kim
(74) *Attorney, Agent, or Firm* — Foundation Law Group LLP; Kwang Jun Kim; J D Harriman

(57) ABSTRACT

Disclosed are a fuel nozzle assembly, and a fuel nozzle module and gas turbine having the same. The fuel nozzle assembly includes a fuel nozzle, a shroud spaced apart from the fuel nozzle and defining a flow path between an inner wall and the fuel nozzle, a rim formed around the shroud to guide air, and a turning guide spaced apart from the rim to distribute the air. The turning guide includes a turning separator spaced apart from the rim to extend in a circumferential direction of the rim, and inner separators extending in a radial direction of the rim to interconnect opposite circumferential ends of the turning separator and an outer surface of the fuel nozzle. The fuel nozzle assembly prevents air pockets, and ensures uniform supply of air, thereby preventing a local increase in combustion temperature inside the fuel nozzle and reducing generation of NOx.

20 Claims, 15 Drawing Sheets

(51) Int. Cl.
*F23D 14/02* (2006.01)
*F23R 3/28* (2006.01)
*F02C 3/04* (2006.01)

(52) U.S. Cl.
CPC ............ *F02C 3/04* (2013.01); *F05D 2220/32* (2013.01); *F05D 2240/35* (2013.01); *F23D 2203/007* (2013.01); *F23D 2206/10* (2013.01); *F23D 2900/14021* (2013.01); *F23D 2900/14481* (2013.01); *F23D 2900/14701* (2013.01)

(56) References Cited

U.S. PATENT DOCUMENTS

| | | | | |
|---|---|---|---|---|
| 8,371,123 | B2 * | 2/2013 | Stewart | F23R 3/10 |
| | | | | 60/737 |
| 8,950,188 | B2 * | 2/2015 | Stewart | F23R 3/26 |
| | | | | 239/405 |
| 8,991,187 | B2 * | 3/2015 | Hughes | F23R 3/286 |
| | | | | 60/740 |
| 9,546,789 | B2 | 1/2017 | Keener et al. | |
| 9,863,637 | B2 * | 1/2018 | Takiguchi | F23R 3/14 |
| 10,060,630 | B2 * | 8/2018 | Stuttaford | F23R 3/34 |
| 2003/0051478 | A1 * | 3/2003 | Matsuyama | F23R 3/286 |
| | | | | 60/725 |
| 2006/0174625 | A1 * | 8/2006 | Ohri | F23R 3/286 |
| | | | | 60/737 |
| 2009/0173074 | A1 * | 7/2009 | Johnson | F23R 3/54 |
| | | | | 60/737 |
| 2009/0320484 | A1 * | 12/2009 | Lacy | F23R 3/10 |
| | | | | 60/748 |
| 2013/0061594 | A1 | 3/2013 | Stewart | |
| 2016/0281979 | A1 * | 9/2016 | Fernandes | F23R 3/14 |

FOREIGN PATENT DOCUMENTS

| | | |
|---|---|---|
| EP | 2568221 A | 3/2013 |
| EP | 2660520 A | 11/2014 |
| EP | 18169526.3 | 8/2018 |
| KR | 100013120 B1 | 8/1982 |
| KR | 20150085745 A | 7/2015 |
| WO | 20160209101 A | 12/2016 |

\* cited by examiner

FUEL NOZZLE ASSEMBLY, AND FUEL NOZZLE MODULE AND GAS TURBINE HAVING THE SAME

CROSS-REFERENCE TO RELATED APPLICATION

This application claims priority to and the benefit of Korean Patent Application No. 10-2017-0054126 filed in the Korean Intellectual Property Office on Apr. 27, 2017, the entire contents of which are incorporated herein by reference.

BACKGROUND

Field

The system relates to a fuel nozzle assembly, and a fuel nozzle module and a gas turbine having the same, and more particularly, to a fuel nozzle assembly that may ensure the uniform supply of air to be introduced into a combustion chamber, and a fuel nozzle module and a gas turbine having the same.

Description of the Related Art

A gas turbine is a power engine in which combustion of compressed air from a compressor and fuel takes place to generate high-temperature gas and a turbine is rotated using the high-temperature gas. Such a gas turbine is used for combined cycle power generation, cogeneration, and the like.

The gas turbine may be largely divided into a compressor, a combustor, and a turbine. The compressor serves to compress air introduced thereinto to a high pressure upon receiving some of the power generated from rotation of the turbine, and the compressed air is transferred to the combustor.

The combustor mixes and ignites the compressed air and fuel to generate a high-temperature combustion gas flow, and discharges the same to the turbine. The discharged combustion gas rotates the turbine so as to enable the acquisition of rotational force. The combustor used in an industrial gas turbine includes a plurality of fuel nozzle modules and is arranged in an annular form surrounding the shaft of the gas turbine. In the fuel nozzle modules, mixing of the air and fuel takes place.

The compressed air from the compressor is introduced into the combustor, and the fuel is injected through swirl vanes, which are arranged in the respective fuel nozzle modules, whereby the air and fuel are mixed with each other. Combustion of the mixture of the air and fuel takes place in a combustion chamber, which is located downstream of the respective fuel nozzle modules, and the resulting combustion gas is discharged to a flow path, which extends to the turbine.

The compressed air is changed in direction when introduced into a fuel nozzle assembly. At this time, an air pocket, which is a region in which the air flows at a low rate, may be generated, thus causing an uneven air flow.

The flow rate of air needs to be maintained constant in order to ensure the uniform supply of air into a fuel nozzle and the uniform mixing of the air and fuel, which may provide stable combustion of the combustion gas. The region in which the flow rate of air is low has the risk of generating flames inside the fuel nozzle, and thus may cause damage to components of the fuel nozzle. In addition, a low-rate air flow causes a local change in the mixture of the air and fuel, which may increase the temperature of combustion or may generate an excessive amount of NOx.

RELATED ART DOCUMENT

Patent Document

Korean Patent Registration No. 10-0013120 entitled COMBUSTION APPARATUS FOR GAS TURBINE ENGINE

SUMMARY OF THE DISCLOSURE

Therefore, the system has been made in view of the related art, and it is an object of the system to provide a fuel nozzle assembly, which may prevent generation of an air pocket and ensure the uniform supply of air to be introduced into a fuel nozzle, through the provision of a turning guide, and a fuel nozzle module and a gas turbine having the same.

In accordance with one aspect of the system, the above and other objects can be accomplished by the provision of a fuel nozzle assembly including a fuel nozzle configured to supply a fuel to a combustion chamber, a shroud spaced apart from the fuel nozzle to surround the fuel nozzle and defining a flow path between an inner wall thereof and the fuel nozzle, a rim formed along an outer circumference of an inlet of the shroud to guide air to the flow path, and a turning guide spaced apart from the rim and configured to distribute a flow of the air to be introduced into the flow path. Here, the turning guide includes a turning separator spaced apart from the rim and formed to extend in a circumferential direction of the rim so as to surround a portion of the rim, and a pair of inner separators formed to extend in a radial direction of the rim so as to interconnect opposite circumferential ends of the turning separator and an outer surface of the fuel nozzle and disposed on the respective circumferential ends of the turning separator.

The turning separator may have a constant circumferential distance between a surface thereof facing the rim and an outer surface of the rim.

The turning separator may include a protrusion disposed on a circumferential central area of the turning separator and configured to protrude so as to increase the circumferential distance between the surface of the turning separator facing the rim and the outer surface of the rim.

The turning separator may include a plurality of protrusions configured to protrude so as to increase the circumferential distance between the surface of the turning separator facing the rim and the outer surface of the rim, the protrusions being arranged in the circumferential direction.

The turning separator may include a recess formed in a circumferential central area of the turning separator and configured to be recessed so as to reduce the circumferential distance between the surface of the turning separator facing the rim and the outer surface of the rim.

The turning separator may include a plurality of recesses configured to be recessed so as to reduce the circumferential distance between the surface of the turning separator facing the rim and the outer surface of the rim, the recesses being arranged in the circumferential direction.

The turning separator may be formed such that a circumferential distance between the turning separator and an outer surface of the rim is gradually increased from an edge to a center thereof.

The turning separator may be formed such that a circumferential distance between the turning separator and an outer surface of the rim is gradually reduced from an edge to a center thereof.

The rim may include an area facing the turning separator formed such that a circumferential distance between an outer surface of the rim and a facing surface of the turning separator is gradually increased from an edge to a center.

The rim may include a recess formed in a center of an area thereof facing the turning separator and configured to be recessed so as to increase a circumferential distance between an outer surface of the rim and a facing surface of the turning separator.

The rim may include a plurality of recesses configured to be recessed so as to increase a circumferential distance between an outer surface of the rim and a facing surface of the turning separator, the recesses being arranged in the circumferential direction.

The rim may include a protrusion disposed on a center of an area thereof facing the turning separator and configured to protrude so as to reduce a circumferential distance between an outer surface of the rim and a facing surface of the turning separator.

The rim may include a plurality of protrusions configured to protrude so as to reduce a circumferential distance between an outer surface of the rim and a facing surface of the turning separator, the protrusions being arranged in the circumferential direction.

The turning separator may be divided into a first area facing an inner wall surface of the shroud and a second area facing an outer surface of the rim, the first area may be parallel to the inner wall surface of the shroud, and the second area may include a curved surface that is convex toward the rim.

The turning separator may be divided into a first area facing an inner wall surface of the shroud and a second area facing an outer surface of the rim, the first area may be parallel to the inner wall surface of the shroud, and the second area may include a curved surface that is concave toward the rim.

The turning separator may be divided into a first area facing an inner wall surface of the shroud and a second area facing an outer surface of the rim, the first area may be parallel to the inner wall surface of the shroud, and the second area may include an inclined surface that is tilted toward the rim.

In accordance with another aspect of the system, there is provided a fuel nozzle module including an inner fuel nozzle assembly, and a plurality of outer fuel nozzle assemblies radially disposed about the inner fuel nozzle assembly. Here, each of the outer fuel nozzle assemblies includes a fuel nozzle configured to supply a fuel to a combustion chamber, a shroud spaced apart from the fuel nozzle to surround the fuel nozzle and defining a flow path between an inner wall thereof and the fuel nozzle, a rim formed along an outer circumference of an inlet of the shroud to guide air to the flow path, and a turning guide spaced apart from the rim and configured to distribute a flow of the air to be introduced into the flow path. Here, the turning guide includes a turning separator spaced apart from the rim and formed to extend in a circumferential direction of the rim so as to surround a portion of the rim, and a pair of inner separators formed to extend in a radial direction of the rim so as to interconnect opposite circumferential ends of the turning separator and an outer surface of the fuel nozzle and disposed on the respective circumferential ends.

The turning guide may be disposed outside a circumference of a respective one of the outer fuel nozzle assemblies.

In accordance with a further aspect of the system, there is provided a gas turbine including a compressor configured to compress air introduced thereinto, a combustor including a fuel nozzle module in which mixing and combustion of the compressed air from the compressor and a fuel take place, and a turbine configured to generate power using a combustion gas from the combustor. Here, the fuel nozzle module includes an inner fuel nozzle assembly, and a plurality of outer fuel nozzle assemblies radially disposed about the inner fuel nozzle assembly. Here, each of the outer fuel nozzle assemblies includes a fuel nozzle configured to supply the fuel to a combustion chamber, a shroud spaced apart from the fuel nozzle to surround the fuel nozzle and defining a flow path between an inner wall thereof and the fuel nozzle, a rim formed along an outer circumference of an inlet of the shroud to guide the air to the flow path, and a turning guide spaced apart from the rim and configured to distribute a flow of the air to be introduced into the flow path. Here, the turning guide includes a turning separator spaced apart from the rim and formed to extend in a circumferential direction of the rim so as to surround a portion of the rim, and a pair of inner separators formed to extend in a radial direction of the rim so as to interconnect opposite circumferential ends of the turning separator and an outer surface of the fuel nozzle and disposed on the respective circumferential ends.

BRIEF DESCRIPTION OF THE DRAWINGS

The above and other objects, features and other advantages of the system will be more clearly understood from the following detailed description taken in conjunction with the accompanying drawings, in which.

DETAILED DESCRIPTION

Figure 1:
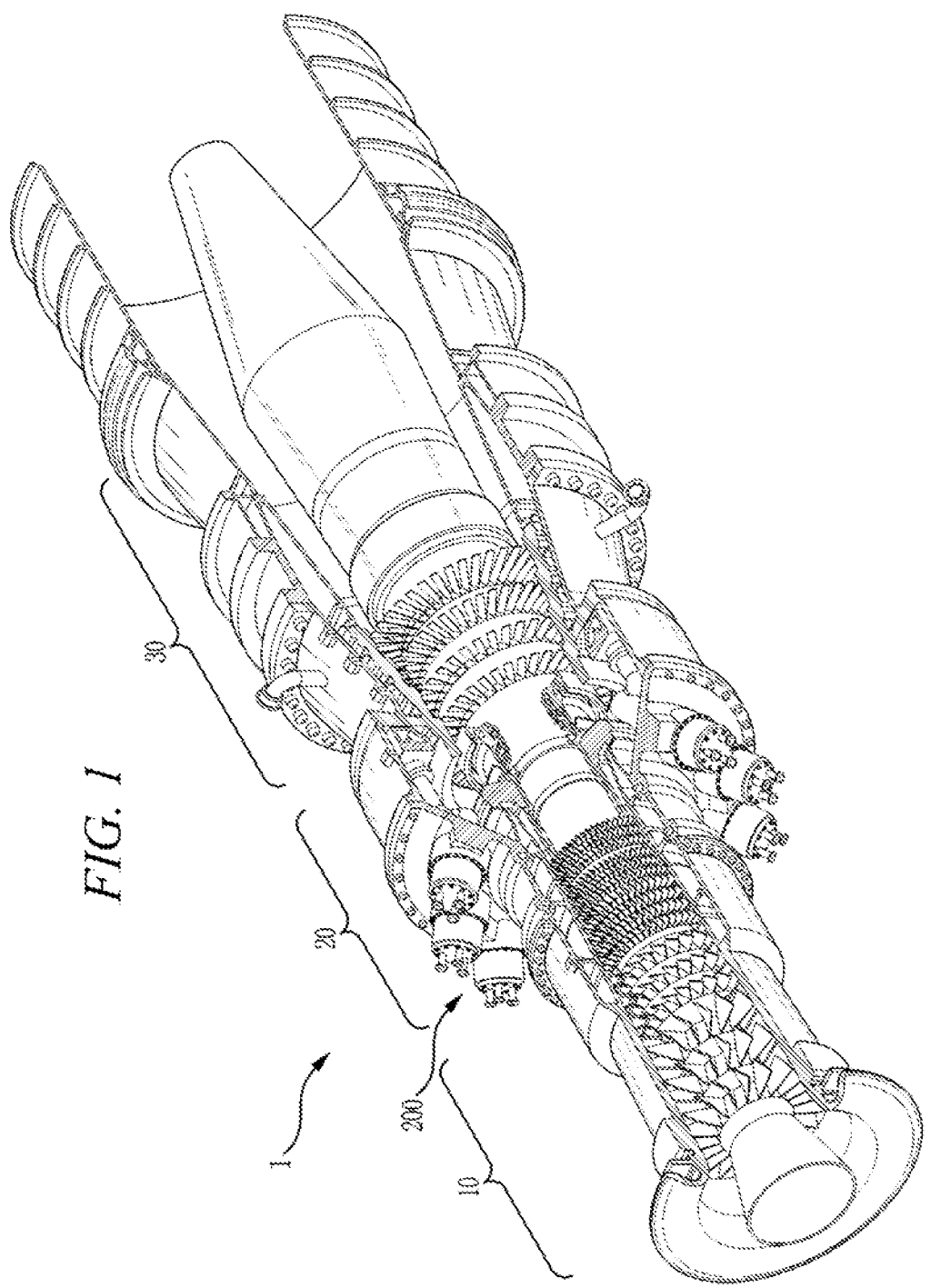
FIG. 1 is a view schematically illustrating the configuration of a gas turbine including a fuel nozzle assembly according to an embodiment of the system.

Hereinafter, a fuel nozzle assembly and a fuel nozzle module and a gas turbine having the same according to the system will be described in detail with reference to the accompanying drawings. The system, however, is not limited to the embodiments disclosed hereinafter and may be embodied in many different forms. Rather, these exemplary embodiments are provided so that this disclosure will be thorough and complete and will fully convey the scope to those skilled in the art. In the drawings, the same or similar elements are denoted by the same reference numerals.

In addition, the term "comprises," "includes," and/or "has", when used in this specification, specify the presence of stated elements, but do not preclude the presence or addition of other elements, unless otherwise defined. In addition, when an element is referred to as being "on" another element, this means that the element is directly on or beneath the other element, and does not necessarily mean that the element is located at the upper side with respect to the gravitational direction.

Figure 2:
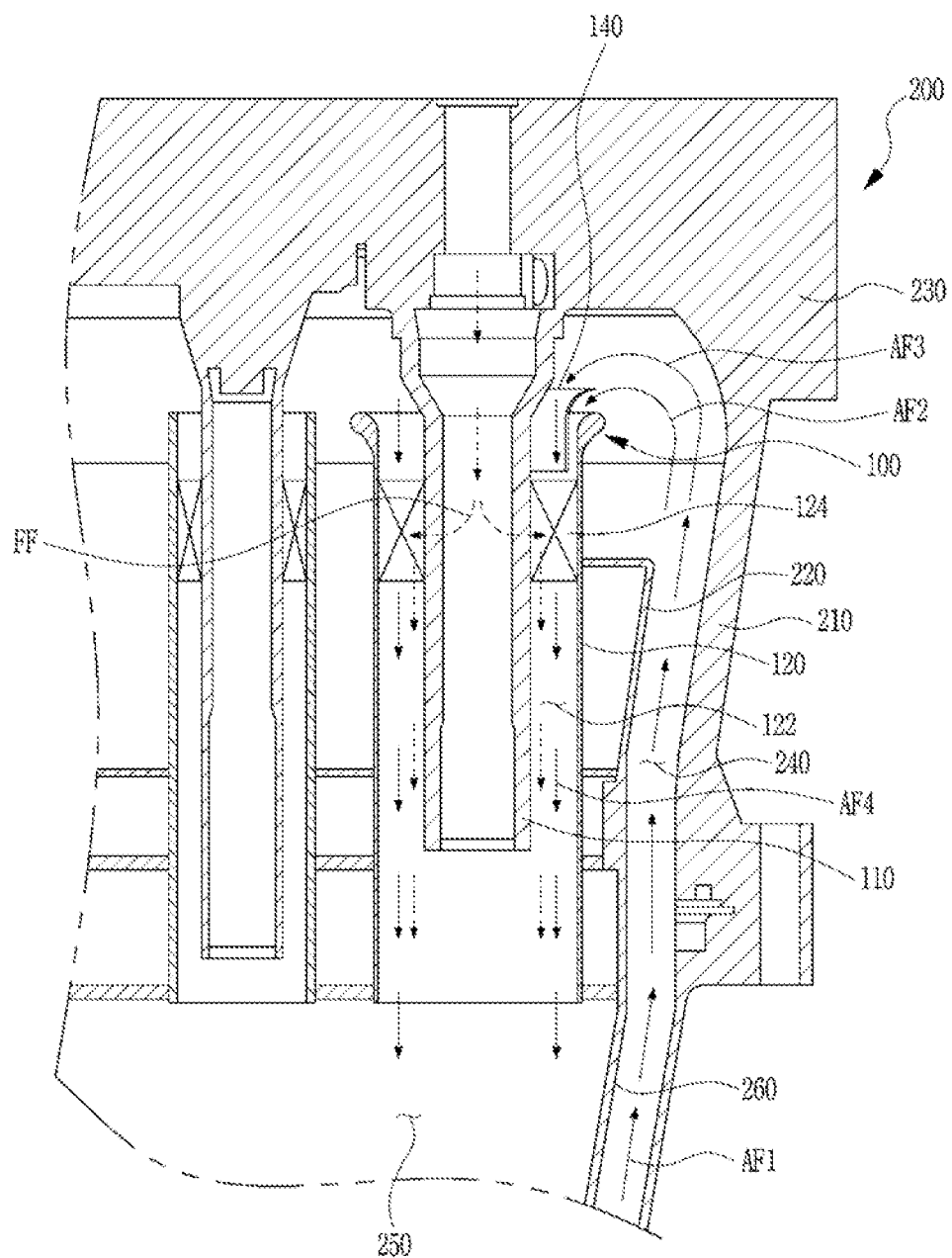
FIG. 2 is a cross-sectional view schematically illustrating a fuel nozzle module according to an embodiment of the system.

FIG. 1 is a view schematically illustrating the configuration of a gas turbine including a fuel nozzle assembly according to an embodiment of the system, and FIG. 2 is a cross-sectional view schematically illustrating a fuel nozzle module according to an embodiment of the system.

The gas turbine 1 may be divided into a compressor 10, which compresses air introduced thereinto to a high pressure, a combustor 20 in which mixing and combustion of the compressed air and fuel take place, and a turbine 30, which generates a rotational force using a combustion gas.

The combustor 20 may include a plurality of fuel nozzle module assemblies 200 arranged in an annular form. Each fuel nozzle module assembly 200 may include a casing 210, a cap sleeve 220, an end plate 230, and a fuel nozzle module 100' (See FIG. 3).

The casing 210 forms the outer wall of the fuel nozzle module assembly 200, has an inner space therein, and is formed to extend in one direction. The casing 210 is generally formed to have a cylindrical shape in an embodiment of the system.

The cap sleeve 220 is disposed inside the casing 210, and is formed along the direction of extension of the casing 210. The cap sleeve 220 is spaced apart from the inner wall surface of the casing 210 by a predetermined distance to form an annular outer flow path 240 between the cap sleeve 220 and the casing inner wall. The cap sleeve 220 is also generally formed to have a cylindrical or tapered cylindrical shape in an embodiment of the system.

The end plate 230 is provided on the end of the casing 210 and coupled to the casing 210 so as to seal the casing 210. The end plate 230 may be coupled to a manifold, a related valve, or the like, which supplies fuel to a nozzle center body 110. In addition, the end plate 230 supports the fuel nozzle module 100' arranged in the casing 210.

The air is compressed in the compressor 10 and is introduced through the outer flow path 240 between the casing 210 and the cap sleeve 220. The compressed air moves along the outer flow path 240 (along a path AF1) and reaches the end plate 230, which is disposed on the end of the casing 210. At this time, the compressed air makes a U-turn in an opposite direction (along paths AF2 and AF3) and is introduced into a fuel nozzle assembly 100 (along a path AF4). When the compressed air is changed in direction in order to enter the fuel nozzle assembly 100, the flow rate of air may be reduced, causing generation of an air pocket. Therefore, it is necessary to prevent this.

Figure 3:
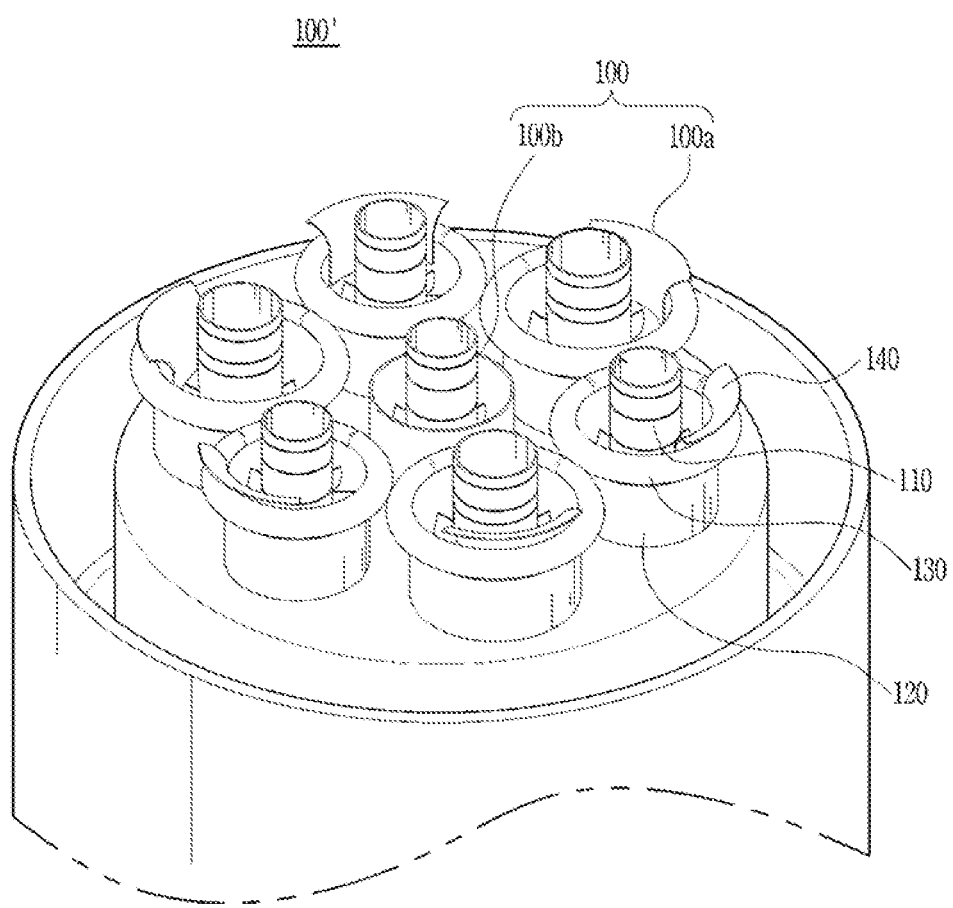
FIG. 3 is a perspective view schematically illustrating a fuel nozzle module including a fuel nozzle assembly according to an embodiment of the system.
Figure 4:
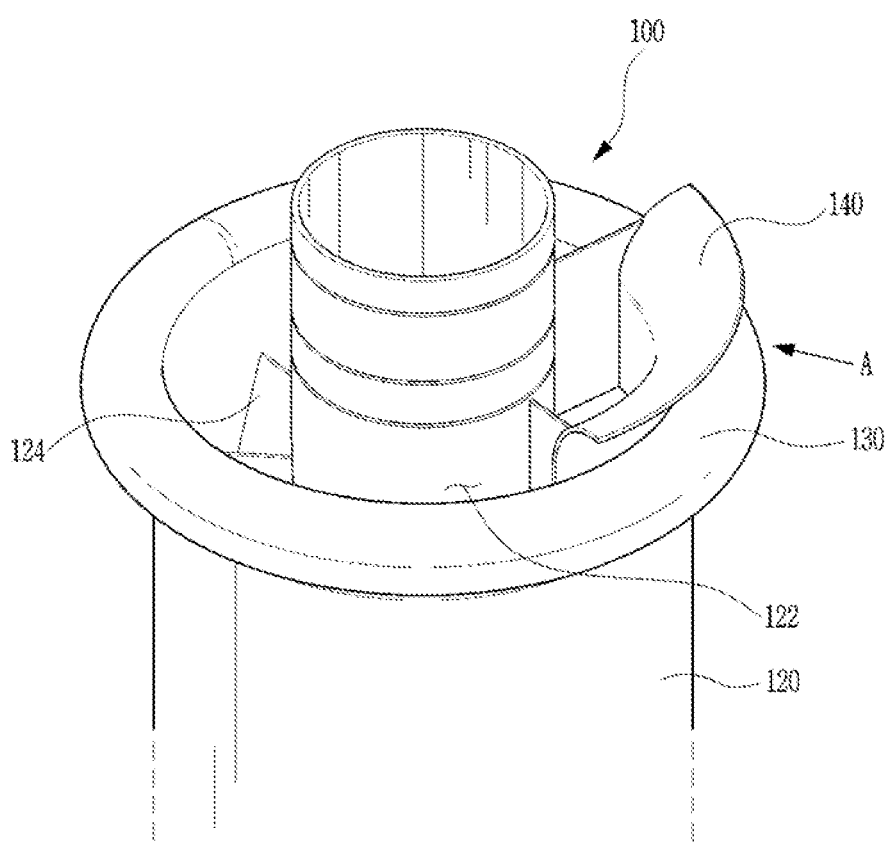
FIG. 4 is a perspective view illustrating a fuel nozzle assembly according to an embodiment of the system.

FIG. 3 is a perspective view schematically illustrating a fuel nozzle module 100' including a fuel nozzle assembly 100 according to an embodiment of the system, and FIG. 4 is a perspective view illustrating a fuel nozzle assembly 100 according to an embodiment of the system.

Referring to FIGS. 3 and 4, the fuel nozzle module 100' according to an embodiment of the system includes an inner fuel nozzle assembly 100b and a plurality of outer fuel nozzle assemblies 100a. In addition, each fuel nozzle assembly 100 according to an embodiment of the system includes a swirl vane 124, the nozzle center body 110, a shroud 120, a rim 130, and a turning guide 140.

The fuel nozzle module 100' may be configured with the arrangement of a plurality of fuel nozzle assemblies 100, and the plurality of outer fuel nozzle assemblies 100a may be radially disposed about the single inner fuel nozzle assembly 100b.

The fuel is supplied from a fuel supply unit and is sprayed through the nozzle center body 110 and the swirl vane 124 (along a path FF), and the mixture of the fuel and air flows into a combustion chamber 250 (See FIG. 2). Thereafter, combustion of the mixture takes place in the combustion chamber 250, which is defined inside a combustion liner 260. The combustion liner 260, which is exposed to a high-temperature combustion gas, is cooled by the relatively cold compressed air introduced through the outer flow path 240. The nozzle center body 110 may be generally formed to have a cylindrical shape in an embodiment of the system, without being limited thereto.

The shroud 120 is spaced apart from the nozzle center body 110 to surround the nozzle center body 110, thereby configuring a flow path 122 so as to allow the fuel and air to pass therethrough. The shroud 120 is formed to extend along the direction of extension of the nozzle center body 110. The shroud 120 may be coaxial with the nozzle center body 110 and spaced apart from the nozzle center body 110 by a constant distance so as to surround the nozzle center body 110. An embodiment of the system illustrates a cylindrical shroud 120. In this case, the cross section of the flow path 122, formed by the nozzle center body 110 and the shroud 120, may have an annular shape.

The rim 130 is connected to an inlet of the shroud 120 and is formed along the outer circumference of the inlet, thereby serving to guide the air to the flow path 122. The rim 130 may have a circumferentially convexly curved surface in order to allow the compressed air to be smoothly introduced into the fuel nozzle assembly 100 while undergoing a change in direction. In the case in which the nozzle center body 110 and the shroud 120 are formed to have a cylindrical shape, the rim 130 is formed to have an annular shape.

Figure 5:
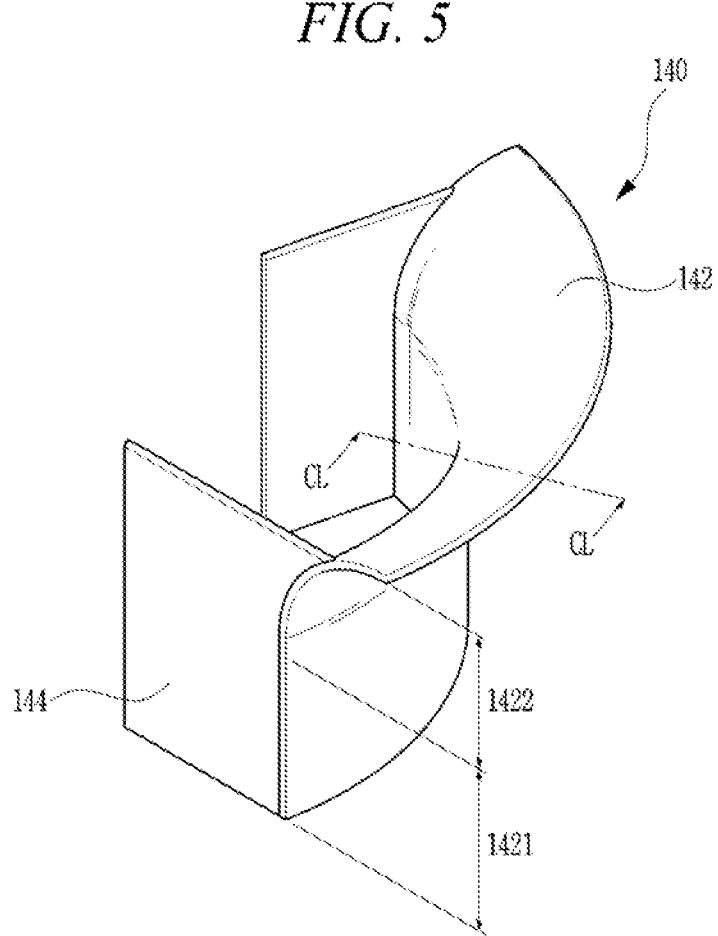
FIG. 5 is a perspective view illustrating a turning guide in a fuel nozzle assembly according to an embodiment of the system.

FIG. 5 is a perspective view illustrating a turning guide in a fuel nozzle assembly according to an embodiment of the system.

The turning guide 140 serves to distribute the flow of air to be introduced into the flow path 122, and is spaced apart from the rim 130. The turning guide 140 may be disposed on a respective one of the outer fuel nozzle assemblies, and may be disposed in radially outer portion of the circumference of each fuel nozzle assembly.

The turning guide 140 may be fixed to the nozzle center body 110 and/or the shroud 120 via a separate rib (not illustrated). The turning guide 140 includes a turning separator 142 and an inner separator 144.

The turning separator 142 may take the form of a plate spaced apart from the rim 130 by a predetermined distance, and may be formed to extend in the circumferential direction of the rim 130 so as to surround a portion of the rim 130.

Figure 6:
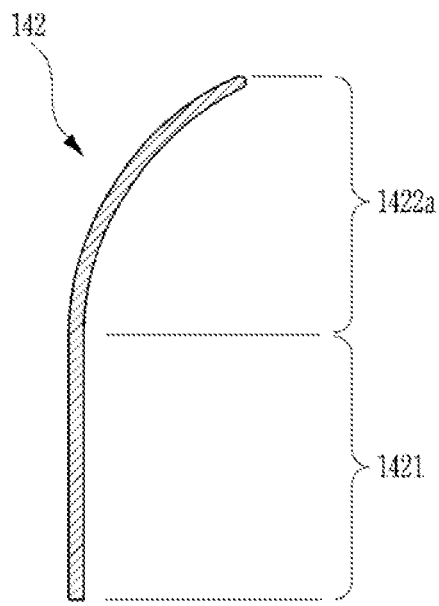
FIGS. 6 to 8 are cross-sectional views taken along cut line CL-CL illustrated in FIG. 5.
Figure 7:
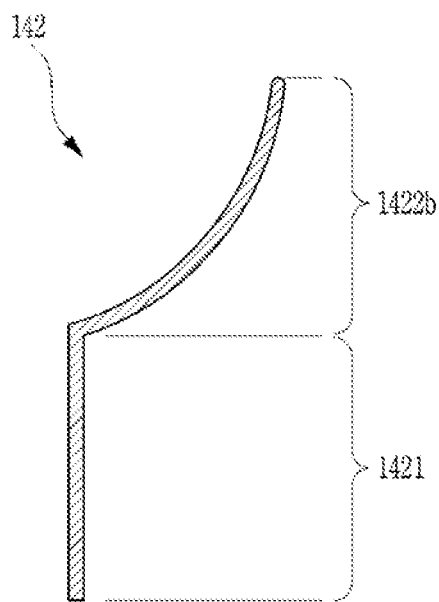
Figure 8:
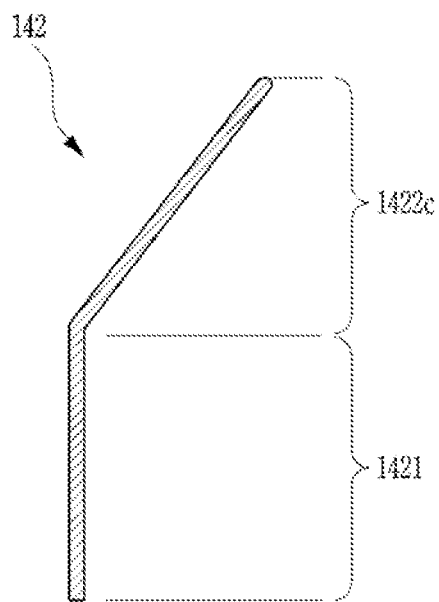

FIGS. 6 to 8 are embodiments of cross-sectional views taken along cut line CL-CL illustrated in FIG. 5.

The turning separator 142 may be divided into a first area 1421, which faces the inner wall surface of the shroud 120, and a second area 1422, which faces the outer surface of the rim 130. The first area 1421 of the turning separator 142 may extend in the same direction as the direction of extension of the nozzle center body 110 and the shroud 120, may be spaced apart from the swirl vane 124, which is located downstream thereof in the air flow direction, and may be disposed parallel to the inner wall surface of the shroud 120. The second area 1422 of the turning separator 142 may extend from the first area 1421 along the outer surface of the rim 130, and may bend from the point at which it is connected to the first area 1421. As such, the second area 1422 may have a curved surface 1422a, which is convex toward the rim 130 as illustrated in FIG. 6, may have a curved surface 1422b, which is concave toward the rim 130 as illustrated in FIG. 7, or may have an inclined surface 1422c, which is tilted toward the rim 130 as illustrated in FIG. 8.

Referring again to FIG. 5, a pair of inner separators 144 may be disposed respectively on opposite circumferential ends of the turning separator 142. The inner separators 144 may take the form of plates, which extend from the turning separator 142 in the radial direction of the rim 130 so as to interconnect the circumferential ends of the turning separator 142 and the outer surface or opposite sides; of the nozzle center body 110.

When the compressed air is introduced into the flow path 122 of the fuel nozzle assembly 100, the compressed air may be divided by the turning separator 142 of the turning guide 140 so as to be introduced into both the space between the rim 130 and the turning separator 142 (along the path AF2 in FIG. 2) and the space between the turning separator 142 and the nozzle center body 110 (along the path AF3 in FIG. 2). In addition, the inner separators 144 of the turning guide 140 may also allow the air to be uniformly introduced into the flow path 122.

Hereinafter, modifications of a turning guide or a rim in a fuel nozzle assembly according to an embodiment of the system will be described with reference to the accompanying drawings.

FIGS. 9 to 13 are conceptual views schematically illustrating modifications of a turning guide in a fuel nozzle assembly according to an embodiment of the system, and illustrate the shape of the turning guide 140 viewed in direction A of FIG. 4, i.e. viewed from the outer circumferential side toward the center side.

Figure 9:
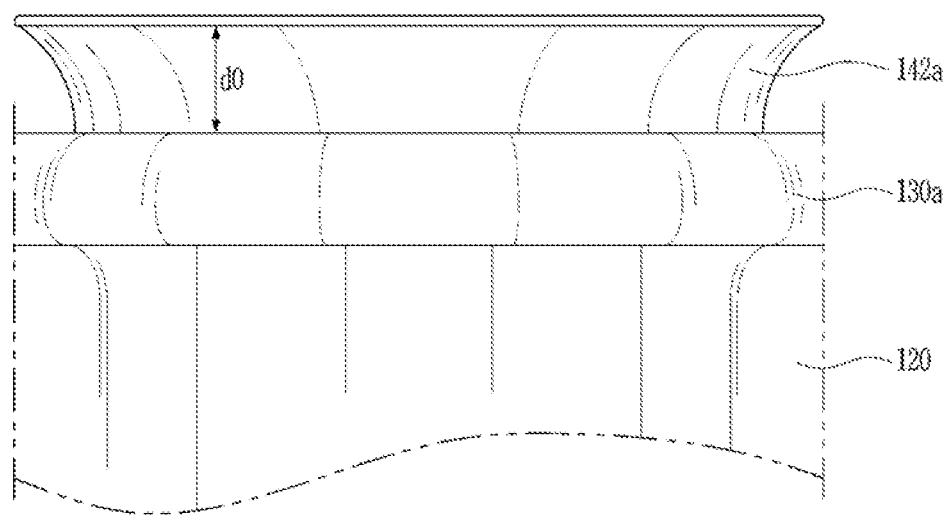
FIGS. 9 to 13 are conceptual views schematically illustrating modifications of a turning guide in a fuel nozzle assembly according to an embodiment of the system.
Figure 10:
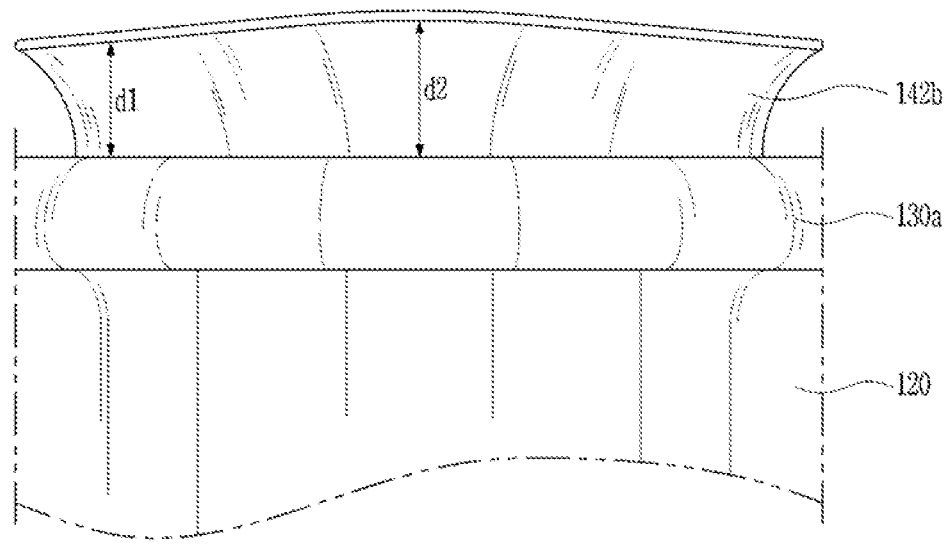

As illustrated in FIG. 9, a turning separator 142a may be formed such that the circumferential distance do between the surface thereof facing a rim 130a and the outer surface of the rim 130a is constant. As illustrated in FIG. 10, a turning separator 142b may be formed such that the circumferential distance between the surface thereof facing the rim 130a and the outer surface of the rim 130a is gradually increased from the circumferential distance d1 at the edge to the circumferential distance d2 at the center. Alternatively, the turning separator may be formed such that the circumferential distance between the surface thereof facing the rim 130a and the outer surface of the rim 130a may be gradually reduced from the edge to the center (not illustrated). By controlling the circumferential distance between the turning separator 142a or 142b and the outer surface of the rim 130a, it is possible to locally control the amount of air that is introduced. In the case in which the circumferential distance is large in the region in which the flow rate of air may be reduced, it is possible to increase the amount of air that is introduced and the flow rate thereof, and to thus prevent the generation of an air pocket.

Figure 11:
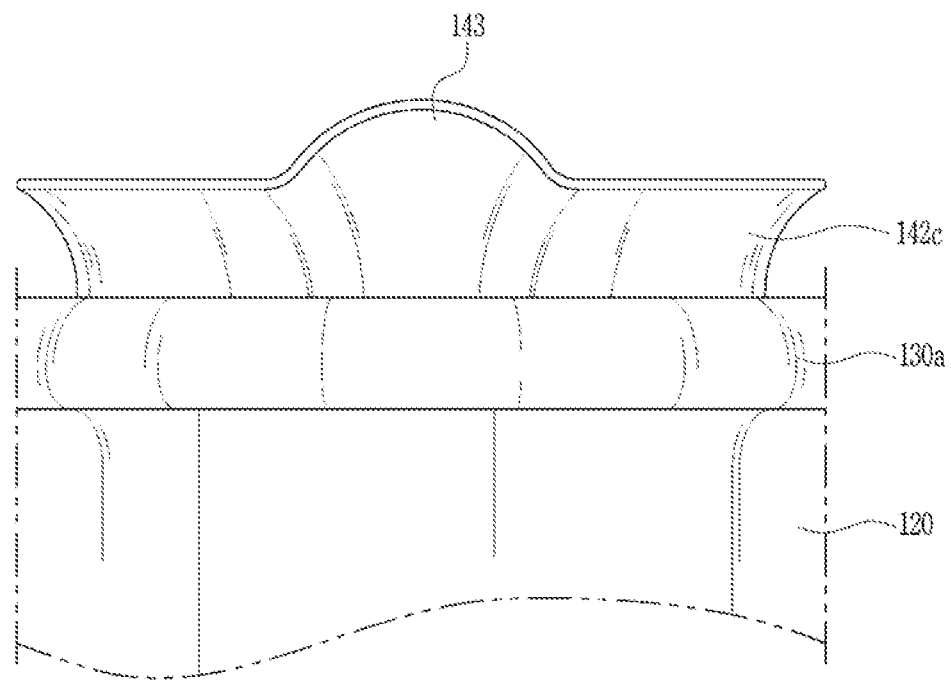

As Illustrated in FIG. 11, a turning separator 142c may include a protrusion 143, which is disposed in the circumferentially central area of the turning separator 142c in order to locally increase the amount of air that is introduced. The protrusion 143 may be formed so as to increase the circumferential distance between the surface of the turning separator 142c facing the rim 130a and the outer surface of the rim 130a.

Figure 12:
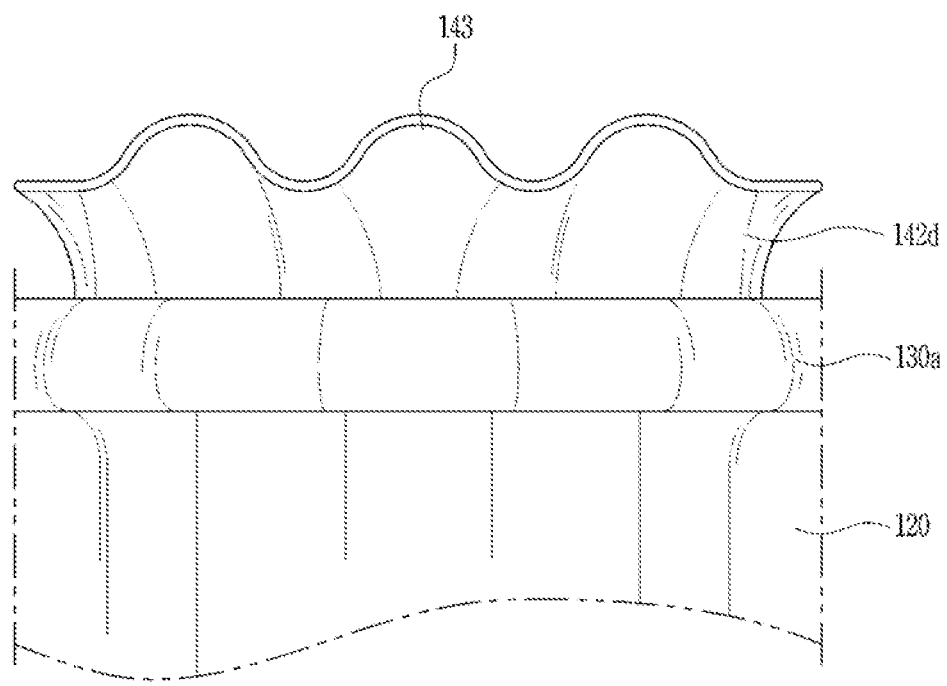

As illustrated in FIG. 12, a turning separator 142d includes a plurality of protrusions 143, which protrude so as to increase the circumferential distance between the surface of the turning separator 142d facing the rim 130a and the outer surface of the rim 130a, and the protrusions 143 may be arranged in the circumferential direction.

Figure 13:
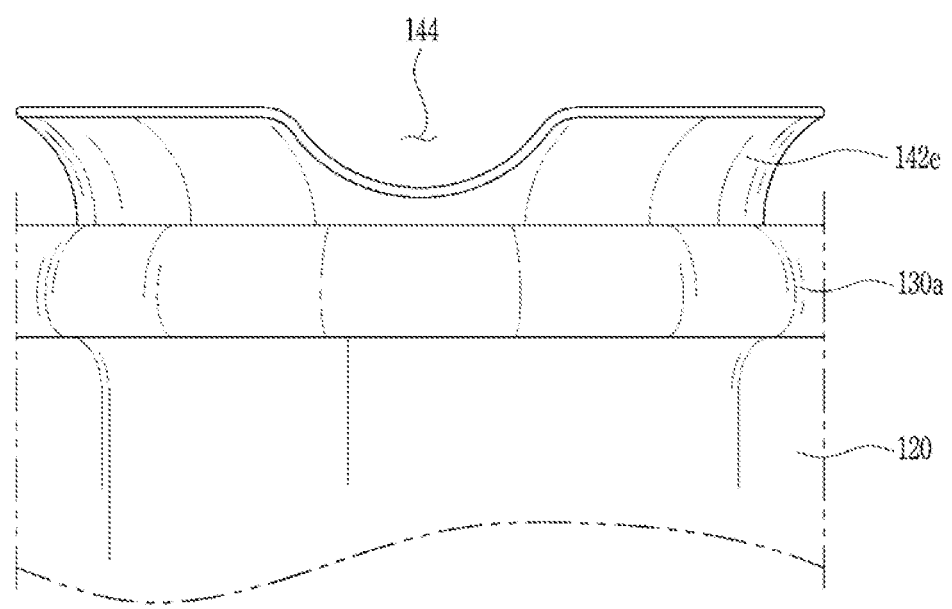

As illustrated in FIG. 13, a turning separator 142e may include a recess 144, which is formed in the circumferentially central area of the turning separator 142e. The recess 144 may be formed such that the circumferential distance between the surface of the turning separator 142e facing the rim 130a and the outer surface of the rim 130a is reduced. As in the modification in which the protrusions 143 are formed, a plurality of recesses may be arranged in the circumferential direction.

When the protrusion 143 or the recess 144 is formed in the turning separator 142c to 142e as described above, the distance between the turning separator 142c to 142e and the rim 130a may be controlled, and the amount of air that is introduced and the flow rate of air may be locally controlled.

FIGS. 14 to 17 are conceptual views schematically illustrating modifications of a rim in a fuel nozzle assembly according to an embodiment of the system, and illustrate the shape of the turning guide 140 viewed in direction A of FIG. 4, i.e. viewed from the outer circumferential side toward the center side.

Figure 14:
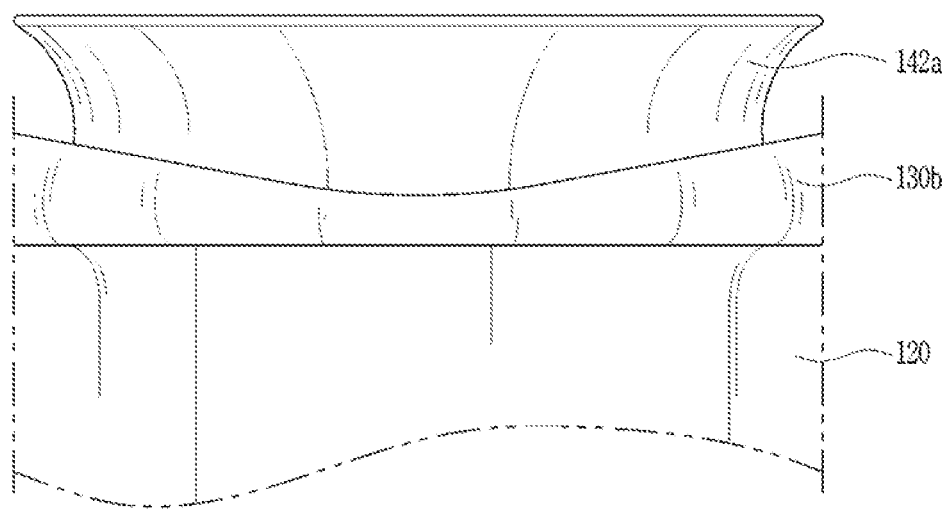
FIGS. 14 to 17 are conceptual views schematically illustrating modifications of a rim in a fuel nozzle assembly according to an embodiment of the system.

As illustrated in FIG. 14, an area of a rim 130b, which faces the turning separator 142a, may be formed such that the circumferential distance between the outer surface of the rim 130b and the facing surface of the turning separator 142a is gradually increased from the edge to the center.

Figure 15:
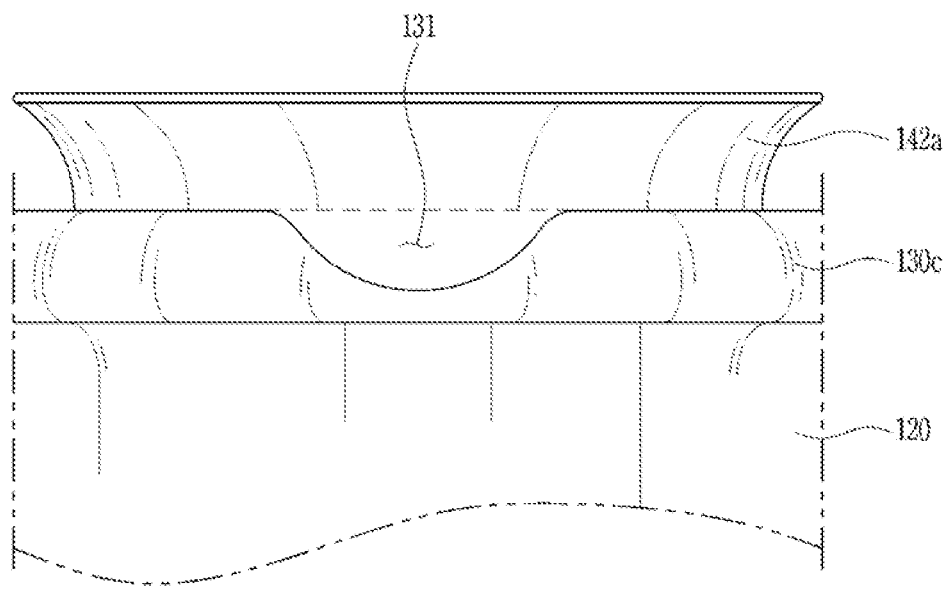

As illustrated in FIG. 15, a rim 130c may include a recess 131, which is formed in the center of an area of the rim 130c facing the turning separator 142a, so as to increase the circumferential distance between the outer surface of the rim 130c and the facing surface of the turning separator 142a.

Figure 16:
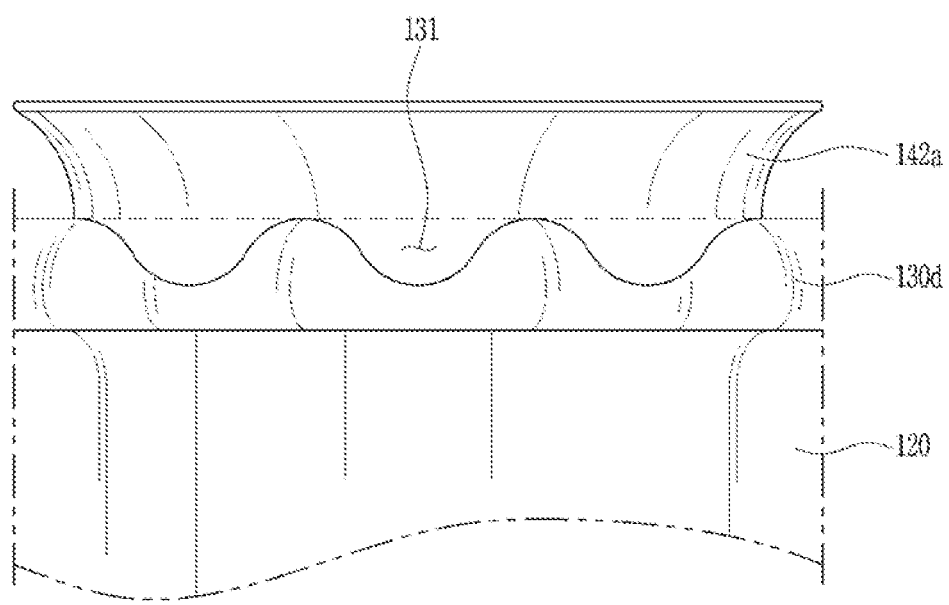

As illustrated in FIG. 16, a rim 130d may include a plurality of recesses 131, which are formed so as to increase the circumferential distance between the outer surface of the rim 130d and the facing surface of the turning separator 142a, and the recesses 131 may be arranged in the circumferential direction.

Figure 17:
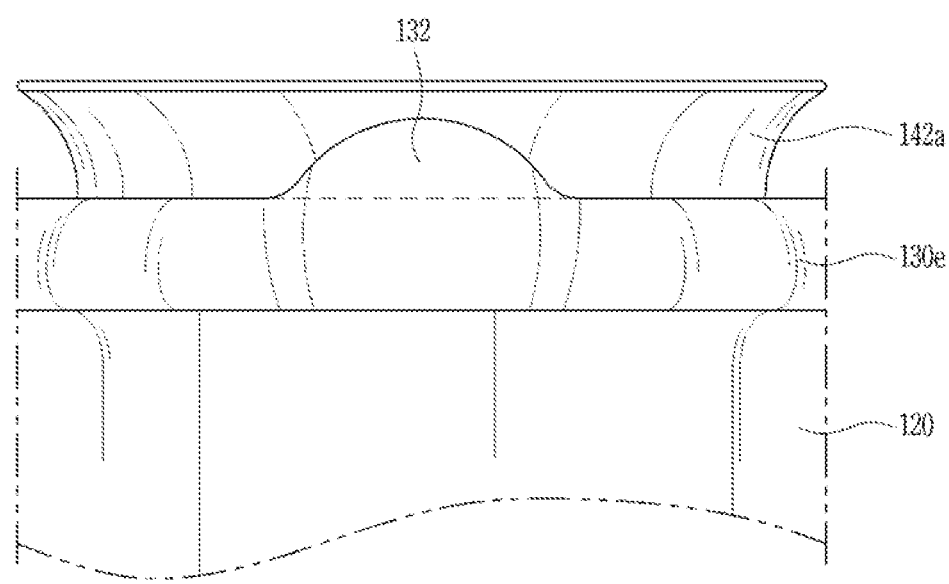

As illustrated in FIG. 17, a rim 130e may include a protrusion 132, which is disposed in the center of an area of the rim 130e facing the turning separator 142a, so as to reduce the circumferential distance between the outer surface of the rim 130e and the facing surface of the turning separator 142a. As in the modification in which the recesses 131 are formed, a plurality of protrusions 132 may be arranged in the circumferential direction.

By controlling the circumferential distance between the turning separator 142a and the rim 130b to 130e, it is possible to locally control the amount of air that is introduced. In the case in which the circumferential distance is large in the region in which the flow rate of air may be reduced, it is possible to control the amount of air that is introduced and the flow rate of air, and to thus prevent the generation of an air pocket.

FIGS. 18 to 21 are conceptual views schematically illustrating combinations of modifications of a turning guide and a rim in a fuel nozzle assembly according to an embodiment of the system.

The turning separator, selected from among the turning separator 142a illustrated in FIG. 9, the turning separator 142b illustrated in FIG. 10, the turning separator 142c illustrated in FIG. 11, the turning separator 142d illustrated in FIG. 12, and the turning separator 142e illustrated in FIG. 13, and the rim, selected from among the rim 130b illustrated in FIG. 14, the rim 130c illustrated in FIG. 15, the rim 130d illustrated in FIG. 16, and the rim 130e illustrated in FIG. 17, may be combined with each other in various ways to control the distance between the turning separator and the rim.

Figure 18:
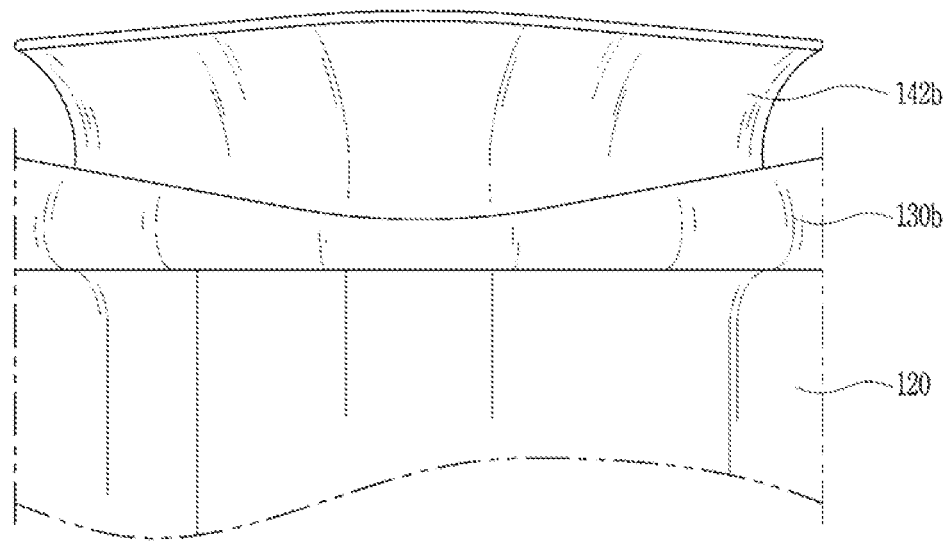
FIGS. 18 to 21 are conceptual views schematically illustrating combinations of modifications of a turning guide and a rim in a fuel nozzle assembly according to an embodiment of the system.
Figure 19:
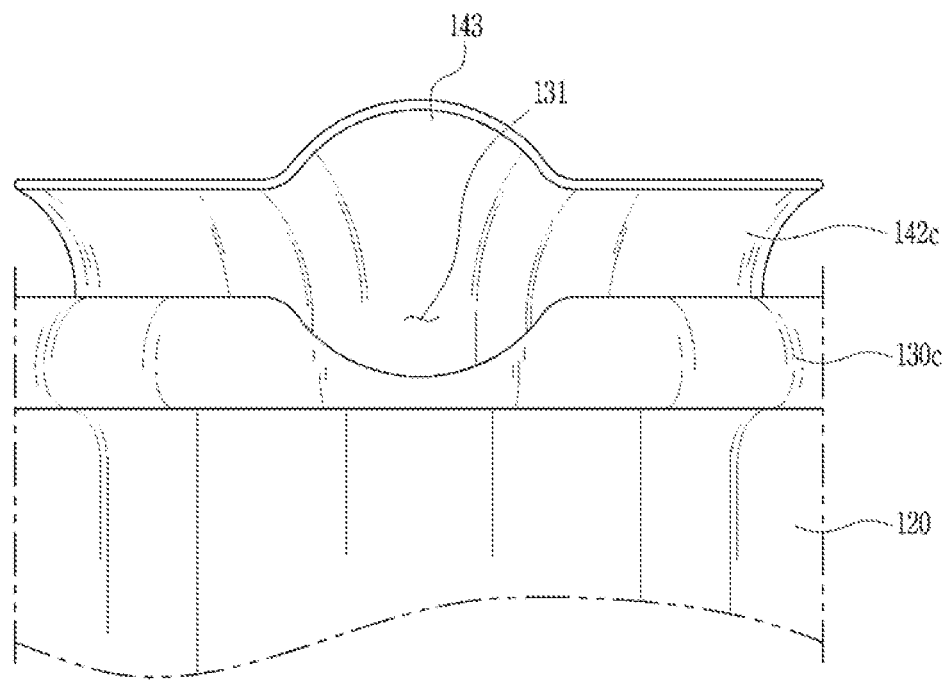
Figure 20:
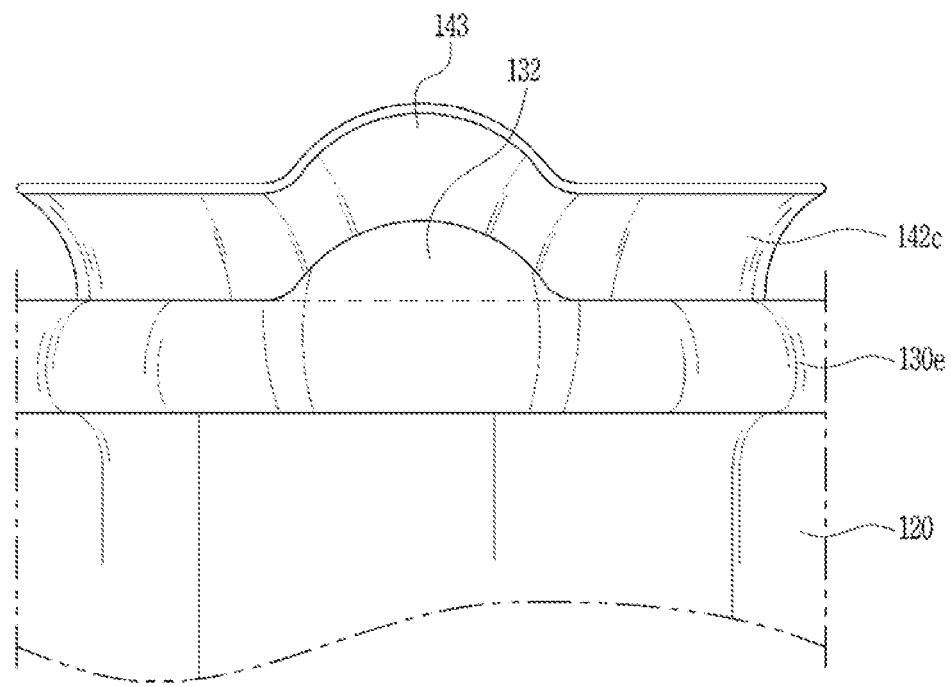
Figure 21:
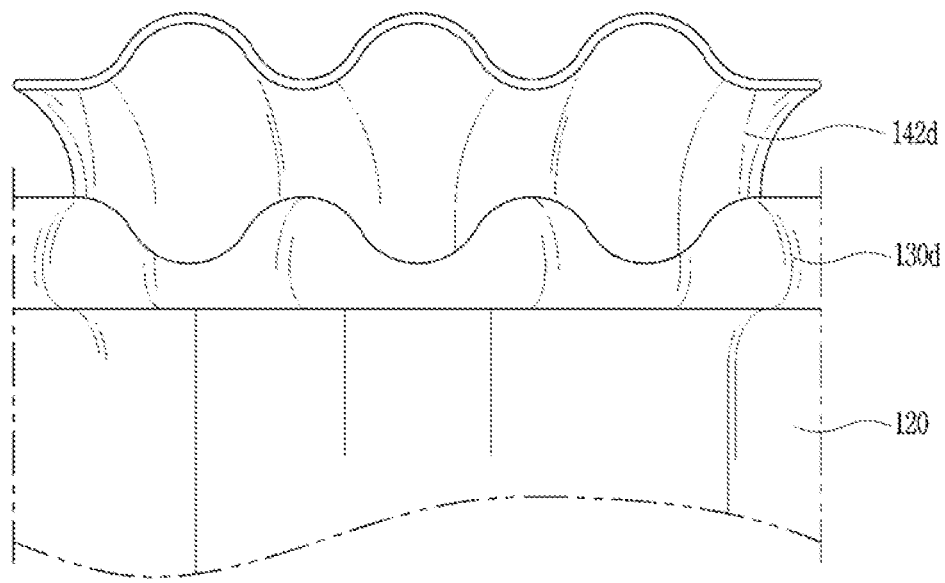

For example, FIG. 18 illustrates the combination of the turning separator 142b and the rim 130b, FIG. 19 illustrates the combination of the turning separator 142c and the rim 130c, FIG. 20 illustrates the combination of the turning separator 142c and the rim 130e, and FIG. 21 illustrates the combination of the turning separator 142d and the rim 130d. These combinations are intended to control the distance between the turning separator and the rim. In addition, although FIG. 21 illustrates the case in which a protrusion of the turning separator 142d and a recess in the rim 130d make a pair, a recess in the turning separator 142d and a protrusion of the rim 130d may make a pair.

The turning guide 140 or the rim 130 may be rotated in the circumferential direction according to the flow rate of introduced air to control the distance therebetween, thereby responding to a change in the amount of air that is introduced. For example, in an embodiment illustrated in FIG. 11, in the case in which it is necessary to increase the amount of air that is introduced from the right side, the turning guide 142c may be rotated in the counterclockwise direction (rightward) to increase the amount of air that is introduced from the right side. In an embodiment illustrated in FIG. 15, in the case in which it is necessary to increase the amount of air that is introduced from the right side, the rim 130c may be rotated in the counterclockwise direction (rightward) to increase the amount of air that is introduced from the right side. In an embodiment, similarly, the turning guide 140 or the rim 130 may be rotated to locally control the amount of air that is introduced.

Figure 22A:
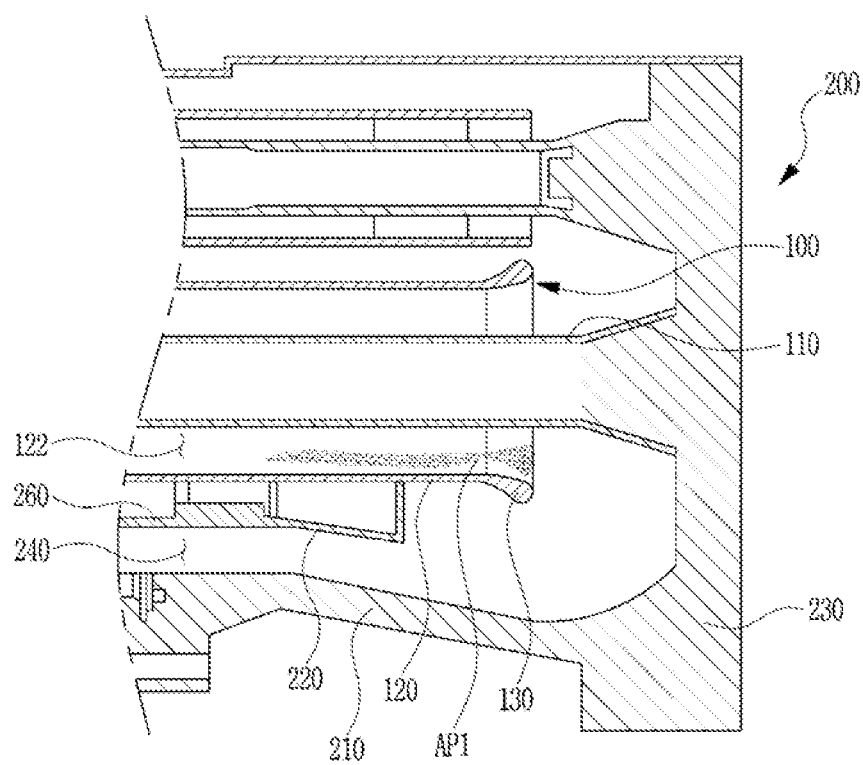
FIG. 22A is a conceptual view schematically illustrating a low-rate air flow region in a fuel nozzle assembly according to the related art.
Figure 22B:
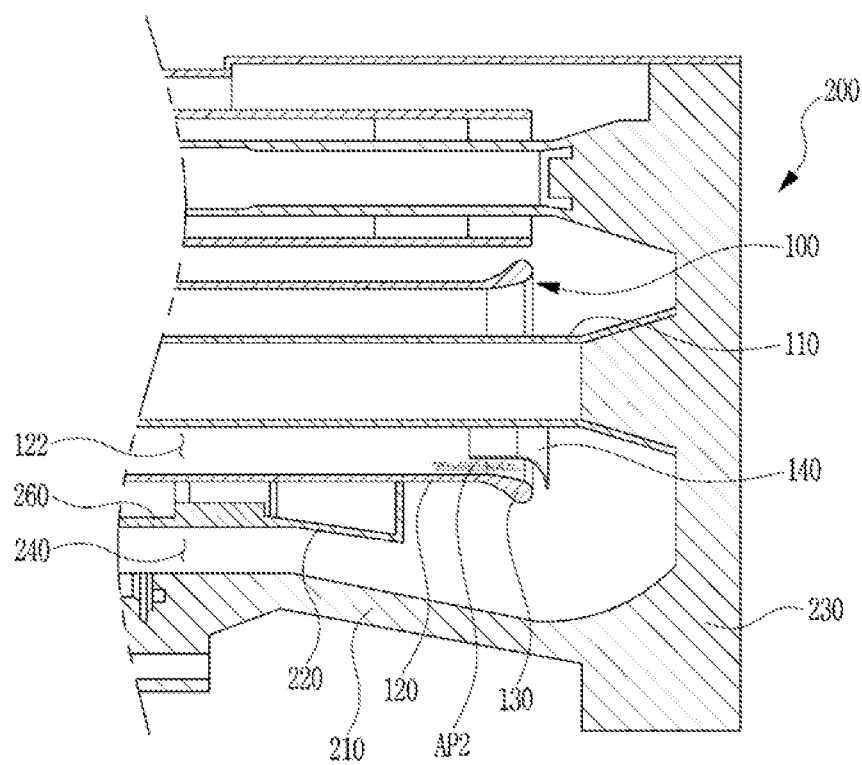
FIG. 22B is a conceptual view schematically illustrating a low-rate air flow region in a fuel nozzle assembly according to an embodiment of the system.

FIG. 22A is a conceptual view schematically illustrating a low-rate air flow region in a fuel nozzle assembly according to the related art, and FIG. 22B is a conceptual view schematically illustrating a low-rate air flow region in a fuel nozzle assembly according to an embodiment of the system.

As illustrated in FIG. 22A, in a conventional fuel nozzle assembly having no turning guide, an air pocket. AP1 is formed over a considerable area. On the other hand, as illustrated in FIG. 22B, it can be appreciated that, in a fuel nozzle assembly according to an embodiment of the system having a turning guide, the size of an air pocket AP2 is greatly reduced compared to the related art.

As is apparent from the above description, according to an embodiment of the system, it is possible to prevent generation of an air pocket and to ensure the uniform supply of air to be introduced into a fuel nozzle.

In addition, according to an embodiment of the system, by uniformly supplying the air, it is possible to prevent a local increase in combustion temperature inside the fuel nozzle and to reduce the generation of NOx. In addition, it is possible to prevent generation of flames inside the fuel nozzle and damage to components of the fuel nozzle due to a local increase in combustion temperature.

An embodiment of the system and the accompanying drawings included in this specification are merely given to concretely describe the technical spirit of the system, and it will be clearly understood that all of various alterations and concrete embodiments, which may be easily inferred by those skilled in the art, within the technical spirit of the system described and illustrated in this specification and the accompanying drawings, fall within the scope of the system.

What is claimed is:

1. A fuel nozzle assembly comprising:
a nozzle center body configured to supply a fuel to a combustion chamber;
a shroud spaced apart from the nozzle center body to surround the nozzle center body and defining a flow path between an inner wall thereof and the nozzle center body;
a rim formed along an outer circumference of an inlet of the shroud to guide air to the flow path; and
a turning guide spaced apart from the rim and configured to distribute a flow of the air to be introduced into the flow path,
wherein the turning guide comprises:
a turning separator spaced apart from the rim and formed to extend in a circumferential direction of the rim so as to surround a portion of the rim, wherein the turning separator is divided into a first area facing an inner wall surface of the shroud and a second area facing an outer surface of the rim; and
a pair of inner separators formed to extend in a radial direction of the rim so as to interconnect opposite circumferential ends of the turning separator and an outer surface of the nozzle center body and disposed on the respective circumferential ends, wherein the inner separators are plates having a first edge along the entire height of the first area of the tuning separator and along a portion of the second area, and extending from the turning separator to the nozzle center body.

2. The assembly according to claim 1, wherein the turning separator has a constant circumferential distance between a surface thereof facing the rim and an outer surface of the rim.

3. The assembly according to claim 2, wherein the turning separator comprises a protrusion disposed on a circumferential central area of the turning separator and configured to protrude so as to increase the circumferential distance between the surface of the turning separator facing the rim and the outer surface of the rim.

4. The assembly according to claim 2, wherein the turning separator comprises a plurality of protrusions configured to protrude so as to increase the circumferential distance between the surface of the turning separator facing the rim and the outer surface of the rim, the protrusions being arranged in the circumferential direction.

5. The assembly according to claim 2, wherein the turning separator comprises a recess formed in a circumferential central area of the turning separator and configured to be recessed so as to reduce the circumferential distance between the surface of the turning separator facing the rim and the outer surface of the rim.

6. The assembly according to claim 2, wherein the turning separator comprises a plurality of recesses configured to be recessed so as to reduce the circumferential distance between the surface of the turning separator facing the rim and the outer surface of the rim, the recesses being arranged in the circumferential direction.

7. The assembly according to claim 1, wherein the turning separator is formed such that a circumferential distance between the turning separator and an outer surface of the rim is gradually increased from an edge to a center thereof.

8. The assembly according to claim 1, wherein the turning separator is formed such that a circumferential distance between the turning separator and an outer surface of the rim is gradually reduced from an edge to a center thereof.

9. The assembly according to claim 1, wherein the rim comprises an area facing the turning separator formed such that a circumferential distance between an outer surface of the rim and a facing surface of the turning separator is gradually increased from an edge to a center.

10. The assembly according to claim 1, wherein the rim comprises a recess formed in a circumferential center of an area thereof facing the turning separator and configured to be recessed so as to increase a circumferential distance between an outer surface of the rim and a facing surface of the turning separator.

11. The assembly according to claim 1, wherein the rim comprises a plurality of recesses configured to be recessed so as to increase a circumferential distance between an outer surface of the rim and a facing surface of the turning separator, the recesses being arranged in the circumferential direction.

12. The assembly according to claim 1, wherein the rim comprises a protrusion disposed on a center of an area thereof facing the turning separator and configured to protrude so as to reduce a circumferential distance between an outer surface of the rim and a facing surface of the turning separator.

13. The assembly according to claim 1, wherein the rim comprises a plurality of protrusions configured to protrude so as to reduce a circumferential distance between an outer surface of the rim and a facing surface of the turning separator, the protrusions being arranged in the circumferential direction.

14. The assembly according to claim 1, wherein the turning separator is divided into a first area facing an inner wall surface of the shroud and a second area facing an outer surface of the rim, and
wherein the first area is parallel to the inner wall surface of the shroud, and the second area comprises a curved surface that is convex toward the rim.

15. The assembly according to claim 1, wherein the turning separator is divided into a first area facing an inner wall surface of the shroud and a second area facing an outer surface of the rim, and
wherein the first area is parallel to the inner wall surface of the shroud, and the second area comprises a curved surface that is concave toward the rim.

16. The assembly according to claim 1, wherein the turning separator is divided into a first area facing an inner wall surface of the shroud and a second area facing an outer surface of the rim, and
wherein the first area is parallel to the inner wall surface of the shroud, and the second area comprises an inclined surface that is tilted toward the rim.

17. A fuel nozzle module comprising:
an inner fuel nozzle assembly; and
a plurality of outer fuel nozzle assemblies radially disposed about the inner fuel nozzle assembly,
wherein each of the outer fuel nozzle assemblies comprises:
a nozzle center body configured to supply a fuel to a combustion chamber;
a shroud spaced apart from the nozzle center body to surround the nozzle center body and defining a flow path between an inner wall thereof and the nozzle center body;
a rim formed along an outer circumference of an inlet of the shroud to guide air to the flow path; and
a turning guide spaced apart from the rim and configured to distribute a flow of the air to be introduced into the flow path, and
wherein the turning guide comprises:
a turning separator spaced apart from the rim and formed to extend in a circumferential direction of the rim so as to surround a portion of the rim, wherein the turning separator is divided into a first area facing an inner wall surface of the shroud and a second area facing an outer surface of the rim; and
a pair of inner separators formed to extend in a radial direction of the rim so as to interconnect opposite circumferential ends of the turning separator and an outer surface of the nozzle center body and disposed on the respective circumferential ends, wherein the inner separators are plates having a first edge along the entire height of the first area of the tuning separator and along a portion of the second area, and extending from the turning separator to the nozzle center body.

18. The module according to claim 17, wherein the turning guide is disposed in outer portion of a circumference of a respective one of the outer fuel nozzle assemblies.

19. A gas turbine comprising:
a compressor configured to compress air introduced thereinto;
a combustor comprising a fuel nozzle module in which mixing and combustion of the compressed air from the compressor and a fuel take place; and
a turbine configured to generate power using a combustion gas from the combustor,
wherein the fuel nozzle module comprises:
an inner fuel nozzle assembly; and
a plurality of outer fuel nozzle assemblies radially disposed about the inner fuel nozzle assembly,
wherein each of the outer fuel nozzle assemblies comprises:
a nozzle center body configured to supply the fuel to a combustion chamber;
a shroud spaced apart from the nozzle center body to surround the nozzle center body and defining a flow path between an inner wall thereof and the nozzle center body;
a rim formed along an outer circumference of an inlet of the shroud to guide the air to the flow path; and
a turning guide spaced apart from the rim and configured to distribute a flow of the air to be introduced into the flow path, and
wherein the turning guide comprises:
a turning separator spaced apart from the rim and formed to extend in a circumferential direction of the rim so as to surround a portion of the rim, wherein the turning separator is divided into a first area facing an inner wall surface of the shroud and a second area facing an outer surface of the rim; and a pair of inner separators formed to extend in a radial direction of the rim so as to interconnect opposite circumferential ends of the turning separator and an outer surface of the nozzle center body and disposed on the respective circumferential ends, wherein the inner separators are plates having a first edge along the entire height of the first area of the tuning separator and along a portion of the second area, and extending from the turning separator to the nozzle center body.

20. The gas turbine according to claim 19, wherein the turning guide is disposed in outer portion of a circumference of a respective one of the outer fuel nozzle assemblies.

\* \* \* \* \*